US006385198B1

(12) United States Patent
Ofek et al.

(10) Patent No.: US 6,385,198 B1
(45) Date of Patent: May 7, 2002

(54) SIGNALING FOR TIMELY FORWARDING IN PACKET SWITCHING NETWORK WITH A COMMON TIME REFERENCE

(75) Inventors: Yoram Ofek, Riverdale, NY (US); Nachum Shacham, Palo Alto, CA (US)

(73) Assignee: Synchrodyne Networks, Inc.

( * ) Notice: Subject to any disclaimer, the term of this patent is extended or adjusted under 35 U.S.C. 154(b) by 0 days.

(21) Appl. No.: 09/124,663

(22) Filed: Jul. 29, 1998

Related U.S. Application Data

(60) Provisional application No. 60/088,921, filed on Jun. 11, 1998.

(51) Int. Cl.[7] .............................................. H04L 12/56
(52) U.S. Cl. ...................................... 370/389; 370/392
(58) Field of Search ................................ 370/389, 390, 370/395, 396, 503, 517, 397, 398, 519, 522, 252, 253, 465, 331, 356, 357; 709/229, 238

(56) References Cited

U.S. PATENT DOCUMENTS

| | | | | |
|---|---|---|---|---|
| 4,821,259 | A | | 4/1989 | DeBruler et al. ............. 370/60 |
| 5,418,779 | A | | 5/1995 | Yemini et al. ................ 370/54 |
| 5,442,636 | A | | 8/1995 | Bontekoe .................... 370/108 |
| 5,455,701 | A | * | 10/1995 | Eng ............................ 359/135 |
| 5,623,483 | A | * | 4/1997 | Agrawal ..................... 370/253 |
| 5,859,835 | A | * | 1/1999 | Varma ........................ 370/229 |
| 5,870,562 | A | * | 2/1999 | Butman ...................... 709/229 |
| 5,896,388 | A | * | 4/1999 | Earnest ....................... 370/395 |
| 6,240,067 | B1 | * | 5/2001 | Sorber ......................... 370/236 |

OTHER PUBLICATIONS

S.J.Golestani, "A Framing Strategy for Congestion Management", *IEEE Journal of Selected Areas in Communications*, vol. 9, No. 7, Sep. 1991, pp. 1064–1077.

Li et al., "Time–driven Priority' Flow Control for Real–time Heterogeneous Internetworking", *Proceedings of Infocom*, vol. 15, Los Alamitos, CA, Mar. 1996, pp. 189–197.

Ballart et al., "SONET: Now It's The Standard Optical Network", *IEEE Communications Magazine*, vol. 29, No. 3, Mar. 1989, pp. 8–15.

Boyle et al., "The COPS (Common Open Policy Service) Protocol", Internet Draft. <draft–ietf–rapcops–01.txt>. Mar. 1998.

R. Braden, "Resource ReSerVation Protocol (RSVP)—Version 1 Functional Specification", *IETF Request for Comment RFC2205*, Sep. 1997.

P.Dana, "Global Positioning System (GPS) Time Dissemination for Real–Time Applications", *Real Time Systems*, Kluwer Academic Publishers, Boston, 1997, pp 9–40.

(List continued on next page.)

*Primary Examiner*—Douglas Olms
*Assistant Examiner*—Ricardo M. Pizarro
(74) *Attorney, Agent, or Firm*—Sitrick & Sitrick

(57) ABSTRACT

This invention describes a method for controlling the creation of data paths of predefined capacity that is needed for timely forwarding of packets in networks where the switches maintain a common time reference. The invention describes a signaling controller that is responsive to a setup request by computing a route of switches for data transmission, and a transmission schedule, which consists of predetermined time frames in which the switches along the route may forward packets of said setup request. The invention describes a switch signaling controller, which operates in every switch and which sends and is responsive to messages regarding reserving and releasing bandwidth on the switch's ports. The invention describes a protocol by which end-stations, gateways, signaling controller, and switch signaling controllers communicate to establish paths of specified capacities; and algorithms for processing signaling messages and finding transmission schedule in the network.

65 Claims, 18 Drawing Sheets

OTHER PUBLICATIONS

M. Decina, "TMN Today: Challenges and Opportunities", *Telecommunications Network Management Into The 21st Century*, IEEE Press, New York, 1994, pp. xv–xvii.

S. Deering, "Multicast Routing In Datagram Internetwork", Ph.D. Thesis, Stanford University, Dec. 1991, pp. 1–36.

S. Deering, "Host Extensions For IP Multicasting", *IETF Request for Comment RFC1112*, Aug. 1989.

Demers et al., "Analysis and Simulation Of A Fair Queuing Algorithm", *ACM Computer Communication Review (SIG-COMM'89)*, pp. 1–12, 1989.

T.Earnest, "GPS Times Isochronous ATM Cells", *Electronic Engineering Times*, Feb. 13, 1995, p. 54.

Ferrari et al., "A Scheme For Real–Time Channel Establishment In Wide–Area Networks", *IEEE Journal on Selected Areas in Communication*, vol. 8, No. 3, Apr. 1990, pp. 368–379.

S.J. Golestani, "Congestion–Free Communication In High–Speed Packet Networks", *IEEE Transactions on Communications*, vol. 39, No. 12, Dec. 1991, pp. 1802–1812.

Handley et al, "SIP–Session Initiation Protocol", <draft–draft–ietf–mmusic–sip–04.ps>, Nov. 1997.

Parekh et al., "Generalized Processor Sharing Approach To Flow Control In Integrated Services Networks: The Multiple Node Case", *IEEE Transactions on Networking*, vol. 2, No. 2, Apr. 1994, pp. 137–150.

Patterson et al., "Pipelining", *Computer Architecture: A Quantitative Approach*, Morgan Kaufman Publishers, San Mateo, CA, 1990, Chapter 6, pp. 251–278.

T. Piotrowski, "Synchronization Of Telecommunication Network Using A Global Positioning Satellite", Abstract, IEEE Plans'92, Mar. 1992.

D.Robinson, "Internet Stratum One GPS Network Time Server: A Commercial Embodiment", Datum Corporation.

Rosen et al., "A Proposed Architecture For MPLS" <draft–ietf–mpls–arch–00.txt> Internet Draft, Aug. 1997.

Schultzrinne et. al, "RTP: A Transport Protocol for RealTime Applications, IETF Request for Comment RFC1889", Jan. 1996.

M. Schwartz, "Networking Layer: Routing Function", *Telecommunication Networks: Protocols, Modeling, and Analysis*, Addison Wesley, Reading MA, 1987, Chapter 6, pp. 259–330.

Shenker et al., "Specification of Guaranteed Quality of Service, IETF Request for Comment RFC2212", Sep. 1997.

W. Stallings, "Overview", *SNMP, SNMPv2, and CMIP: The Practical Guide to Network Management*, Addison Wesley, 1993, Chapter 1, pp. 1–14.

A.Tannebaum, "Routing Algorithms", *Computer Networks*, (3rd Ed) Prentice Hall, 1996, Chapter 5.2, pp. 345–374.

C. Topolcic (Ed.) Experimental Internet Stream Protocol, Version 2 (ST–II), RFC 1190, Oct. 1990.

J. Wroclawski, "Specification of the Controlled–Load Network Element Service", IETF RFC 2211, Sep. 1997.

D. Mills, "Network Time Protocol (Version 3) Specification, Implementation and Analysis", Network Working Group, RFC 1305, University fo Delaware, Mar. 1992.

Händel et al., "Signalling", *ATM Networks: Concepts, Protocols, and Applications*, (2nd Ed.) Addison–Wesley Publishing Co., 1994, Chapter 6, pp. 141–158.

Hennessy et al., "Enhancing Performance with Pipelining", *Computer Organization & Design: The Hardware/Software Interface*, Morgan Kaufman Publishers, San Mateo, CA, 1994, Chapter 6, pp. 364–389.

C. Huitema, "Why is RIP So Simple?", *Routing In The Internet*, Prentice Hall, 1995, chapter 4, pp. 65–98.

IEEE 802.9a Editor. Integrated service (is): IEEE 802.9a "Isochronous Services With CSMA/CD MAC Service", IEEE Draft, Mar. 1995.

ITU–T, "Visual Telephone Systems and Equipment For Local Area Networks Which Provide A Non–Guaranteed Quality Of Service", ITU–T Recommendation H. 323, 1996.

ITU–T "Line Transmission Of Non–Telephone Signals: Control Protocol For Multimedia Communications", ITU–T Recommendation H. 245, 1994.

Kandlur et al., "Real Time Communication In Multi–Hop Networks", *IEEE Transactions On Parallel and Distributed Systems*, vol. 5, No. 10, Oct. 1991, pp. 10441055.

M.G.H. Katevenis, "Fast Switching And Fair Control Of Congested Flow In Broadband Networks", *IEEE Journal on Selected Areas in Communications*, vol. SAC–5, No. 8, Oct. 1987, pp. 1315–1326.

J.Levine, "An Algorithm to Synchronize the Timne of a Computer to Universal Time", *IEEE/ACM Transactions on Networking*, vol. 3, No. 1, Feb. 1995, pp 42–50.

Li et al., "Pseudo–Isochronous Cell Switching In ATM Networks", IEEE INFOCOM'94, pp. 428–437, 1994.

D.Mills, "Improved Algorithms for Synchronizing Computer Network Clocks", *Computer Comm. Rev. (USA)*, vol. 24, No. 4, Oct. 1994, pp 317–327.

D. Mills, "Internet Time Synchronization: The Network Time Protocol", *IEEE Transactions on Communications*, vol. 39, No. 10, Oct. 1981, pp. 1482–1493.

Y. Ofek, "The Topology, Algorithms And Analysis Of A Synchronous Optical Hypergraph Architecture", Ph.D. Dissertation, Electrical Engineering Department, University of Illinois at Urbana, Report No. UIUCDCS–R–87–1343, May 1987.

Y. Ofek, "Integration Of Voice Communications On A Synchronous Optical Hypergraph", INFOCOM'88, 1988.

Y. Ofek, "Generating A Fault Tolerant Global Clock Using High–Speed Control Signals For The MetaNet Architecture", *IEEE Transactions on Communications*, pp. 2179–2188, May 1994.

Ofek et al., "Time–Driven Priority' Flow Control For Real–Time Heterogeneous Internetworking", IEEE INFOCOM'96, 1996.

* cited by examiner

FIG. 8

| Switch | Output port | Capacity | TF1 | TF2 | | TFn | | TFk | | | | |
|---|---|---|---|---|---|---|---|---|---|---|---|---|
| S1 | 1 | 5600 | 2800 | 3500 | | 3500 | | 1800 | | | | |
| S1 | 2 | 2400 | 1250 | 1000 | | 600 | | 1200 | | | | |
| | | | | | | | | | | | | |
| Sl | Pm | | | | | | | | | | | |
| | | | | | | | | | | | | |
| | | | | | | | | | | | | |

| Port # (Pm) | Link Capacity | Time Frame # (TFn) | | | |
|---|---|---|---|---|---|
| | | 1 | 2 | ... | |
| 1 | 2400 | 1500 | 1750 | ... | |
| 2 | 2400 | 1200 | 2220 | ... | 1000 |
| 3 | 2400 | 2000 | $C(P_m, TF_n)$ | ... | 1800 |
| 4 | 2400 | 800 | 750 | ... | 2000 |

122

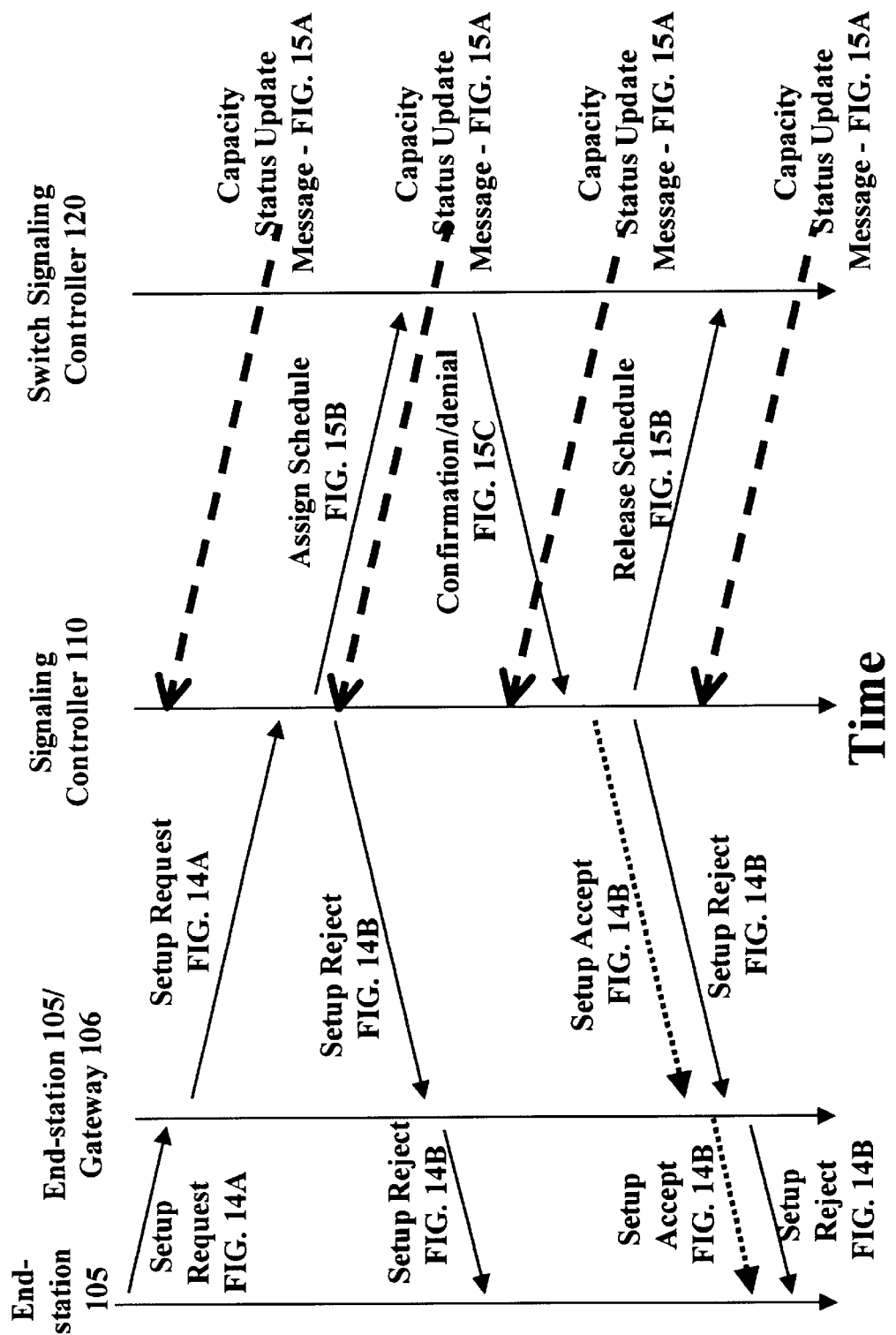

FIG. 14A

| Destination ID | Source ID | Request ID | Signaling Controller ID | Request Description |
|---|---|---|---|---|

Setup request message

FIG. 14B

| Accept/Reject | Request ID | Signaling Controller ID | End station/Gateway ID |
|---|---|---|---|

Request accept/reject message

FIG. 15A

Capacity status update message

| 700 | ... | 1520 | C(S*l*,P*m*,TF*n*) | 2220 | Switch ID |

Capacity assign/release schedule message

| TF-In, TF-Out, capacity | TF-In, TF-Out, capacity | Port-In, Port-Out | PID | Assign/Release | Switch ID |

FIG. 15C

Assignment confirmation/denial message

| Confirmation/Denial | Request ID | Switch Controller ID |

FIG. 18

```
l = k
FOUND = TRUE
d_{S,S+1} = 0
for s = 1 to S {
    D = d_{s,s+1}
    if F_l is available
        Frame[s] = l
        l = (l+D+1) mod K
    else
        l = (l+1) mod K
        if F_l is available
            Frame[s] = l
            l = (l+D) mod K
        else
            FOUND = FALSE
}
if FOUND = TRUE {
    for s = 1 to S {
        s -> Switch ID
        TF-out for Switch ID = Frame[s]
        if s > 1
            TF-in for s =
                TF out for s-1 + d-1_{S-1,S}
    }
}
```

112-4

S -- Number of switches on route
$d_{S,S+1}$ -- Delay between switches $s$ and $s+1$
Frame[s] -- The frame chosen for schedule at $s$
K -- Number of frames in a cycle
k -- Frame number chosen for switch 1

SIGNALING FOR TIMELY FORWARDING IN PACKET SWITCHING NETWORK WITH A COMMON TIME REFERENCE

RELATED APPLICATIONS

This application is a continuation of provisional application Ser. No. 60/088,921 filed Jun. 11, 1998.

BACKGROUND OF THE INVENTION

This invention relates generally to a method and apparatus for sending and responding to signaling messages. Specifically, the invention provides controls for a communications network in order to create paths for timely forwarding and delivery of data. Consequently, the end-to-end performance parameters, such as, loss, delay and jitter, have either deterministic or probabilistic guarantees.

The proliferation of high-speed communications links, fast processors, and affordable, multimedia-ready personal computers brings about the need for wide area networks that can carry real time data, like telephony and video. However, the end-to-end transport requirements of real-time multimedia applications present a major challenge that cannot be solved satisfactorily by current networking technologies. Such applications as video teleconferencing, and audio and video multicasting generate data at a wide range of bit rates and require predictable, stable performance and strict limits on loss rates, average delay, and delay variations ("jitter"). These characteristics and performance requirements are incompatible with the services that current circuit and packet switching networks can offer.

Circuit-switching networks, which are still the main carrier for real-time traffic, are designed for telephony service and cannot be easily enhanced to support multiple services or carry multimedia traffic. Its synchronous byte switching enables circuit-switching networks to transport data stream at constant rate with little delay or jitter. However, since circuit-switching networks allocate resources exclusively for individual connections, they suffer from low utilization under bursty traffic. Moreover, it is difficult to allocate dynamically circuits of widely different capacities, which makes it a challenge to support multimedia traffic. Finally, the synchronous byte switching of SONET, which embodies the Synchronous Digital Hierarchy (SDH), requires increasingly more precise clock synchronization as the lines speed increases. For further discussion of circuit switching see, for example, [R. Ballart and Y-C. Ching SONET: now it's the standard optical network, IEEE Communications Magazine, Vol. 29 No. 3, March 1989, pages 8–15.

Packet switching networks like IP-based Internet and Intranets [A. Tannebaum Computer Networks (3rd Ed) Prentice Hall 1996] and ATM [R. Handel, M. N. Huber, and S. Schroder. ATM Networks: Concepts, Protocols, and Applications (2nd Ed.) Addison-Wesley, 1994] handle bursty data more efficiently than circuit switching, due to their statistical multiplexing of the packet streams. However, current packet switches and routers operate asynchronously and provide best effort service only, in which end-to-end delay and jitter are neither guaranteed nor bounded. Furthermore, statistical variations of traffic intensity often lead to congestion that results in excessive delays and loss of packets, thereby significantly reducing the fidelity of real-time streams at their points of reception. In fact, under best effort service, the performance characteristics of a given connection are not even predictable at the time of connection establishment.

Efforts to define advanced services for both IP and ATM have been conducted in two levels: (1) definition of service, and (2) specification of methods for providing different services to different packet streams. The former defines interfaces, data formats, and performance objectives. The latter specifies procedures for processing packets by end-stations and switches/routers. The types of services that were defined for ATM include constant bit rate (CBR), variable bit rate (VBR) and available bit rate (ABR). For IP the defined services include guaranteed performance (bit rate, delay), controlled flow, and best effort (see [J. Wroclawski. Specification of the Controlled-Load Network Element Service. IETF RFC 2211, September 1997] and [S. Shenker et. al. Specification of Guaranteed Quality of Service. IETF RFC 2212. September 1997].

Signaling is a collecting name for methods for specifying desired characteristics of a communication path, establishing such paths for transferring data, and releasing communications paths at the end of the communications session. Signaling has been initially developed for circuit switching networks, which offer a single type of connection, namely, voice-grade circuit. Telephony signaling is carried in-band—on the same lines that carry the voice signals—and it aims at reserving resources along the desired path for the exclusive use of the participants of the phone call.

Signaling for packet switching networks were first developed to provide grades of service better than the default "best-effort", most notably for interactive packet voice and video applications. Two signaling protocols that were developed for IP networks, e.g., the Internet, are ST-II [C. Topolcic (Ed.) Experimental Internet Stream Protocol, Version 2 (ST-II), RFC 1190, October 1990] and RSVP [R. Braden, Resource ReSerVation Protocol (RSVP)—Version 1 Functional Specification., IETF Request for Comment RFC2205, September 1997]. Messages of these protocols, which are carried in band between neighboring packet switches, convey requests for allocation of link capacity and buffer space. UNI3.1, is a signaling protocol for ATM networks, which is also in band control [R. Handel, M. N. Huber, and S. Schroder. ATM Networks: Concepts, Protocols, and Applications (2nd Ed.). Addison-Wesley, 1994]. The signaling protocols for packet switching networks are as effective as the underlying mechanisms for reserving resources.

SUMMARY OF THE INVENTION

This invention describes a method for controlling the creation of data paths of predefined capacity that is needed for timely forwarding of packets in networks where the switches maintain a common time reference. The invention describes a signaling controller that is responsive to a setup request by computing a route of switches for data transmission, and a transmission schedule, which consists of predetermined time frames in which the switches along the route may forward packets of said setup request. The invention describes a switch signaling controller, which operates in every switch and which sends and is responsive to messages regarding reserving and releasing bandwidth on the switch's ports. The invention describes a protocol by which end-stations, signaling controller, and switch signaling controllers communicate to establish paths of specified capacities; and algorithms for processing signaling messages and finding transmission schedule in the network.

This invention teaches a method for signaling in packet switching networks that differ from the aforementioned protocols in the following: (1) it is designed for a network where the switches have a common time frame, using which precise resource allocation and data delivery parameters can be configured, and (2) its signaling messages are carried out of band, that is, through a data network—e.g., the Internet or ATM-which is separate from the network on which data packets are transmitted.

The method and apparatus that are disclosed in this invention aim at providing virtual pipes that carry real-time traffic over packet switching networks while guaranteeing end-to-end performance. The method combines the advantages of both circuit and packet switching. It provides for allocation for the exclusive use of predefined connections and for those connections it guarantees loss free transport with low delay and jitter. When predefined connections do not use their allocated resources, other packets can use them without affecting the performance of the predefined connections.

Under the aforementioned prior art methods for providing packet switching services, switches and routers operate asynchronously. This invention describes a method that controls and manages the provisioning of real-time services by synchronous methods that utilize a time reference that is common to the switches and end-stations comprising a wide area network. The common time reference can be realized by using UTC (Coordinated Universal Time), which is globally available via, for example, GPS (Global Positioning System) [T. Piotrowski. Synchronization of telecommunication network using a global positioning satellite. IEEE PLANS'92, March 1992]—see for example: http://www.utexas.edu/depts/grg/gcraft/notes/gps/gps.html). By international agreement, UTC is the same all over the world. UTC is the scientific name for what is commonly called GMT (Greenwich Mean Time), the time at the 0 (root) line of longitude at Greenwich, England. In 1967, an international agreement established the length of a second as the duration of 9,192,631,770 oscillations of the cesium atom. The adoption of the atomic second led to the coordination of clocks around the world and the establishment of UTC in 1972. The Time and Frequency Division of the National Institute of Standard and Technologies (NIST) (see http:\\www.boulder.nist.gov/timefreq) is responsible for coordinating with the International Bureau of Weights and Measures (BIPM) in Paris in maintaining UTC.

UTC timing is readily available to individual PCs through GPS cards. For example, TrueTime, Inc.'s PCI-SG provides precise time, with zero latency, to computers that have PCI extension slots. Another way by which UTC can be provided over a network is by using the Network Time Protocol (NTP) [D. Mills, Network time protocol (Version 3), IETF RFC1305], however, the clock accuracy is not adequate for inter-switch coordination, on which this invention is based.

Two internet-based signaling protocols are based on out-of-band message exchange for marshaling resources. The Session Invitation Protocol (SIP) is designed to carry to potential session participants information about the session that they are invited to join including the types of data that are exchanged in the session and the quality of service needed to participate [M. Handley et. al, SIP-Session Initiation Protocol <draft-draft-ietf-mmusic-sip-04.ps> November 1997]. SIP, however, does not results in allocation of resources. The Common Open Policy Service Protocol (COPS) is conducted between a QoS policy server and network switches/routers. COPS, however, is not capable of dealing with networks that maintain a common time frame and it cannot guarantee performance to end users [J. Boyle et al., The COPS (Common Open Policy Service) Protocol. Internet Draft. <draft-ietf-rap-cops-01.txt>. March 1998].

U.S. Pat. No. 5,623,483 [P. Agrawal et al. "Synchronization system for networked multimedia streams", U.S. Pat. No. 5,623,483 Issued Apr. 22, 1997] discloses a method for network data stream synchronization method, which accepts loss parameters and initialized a data stream buffer. The method measures actual network delay experienced by a data packet and imposes a buffer delay to provide a fixed end-to-end delay. Packets arriving too late to be played within the fixed end-to-end delay are discarded. This methods, however, only attempts to adapt to delay under asynchronous data transfer and does not guarantee a predetermined delay. Another related method is disclosed in U.S. Pat. No. 4,821,259 [D. DeBruler et al., "Control information communication arrangement for a distributed control switching system", U.S. Pat. No. 4,821,259, Issued Apr. 11, 1989].

U.S. Pat. No. 5,442,636 [M. H. Bontekoe, "Circuit and method for alignment of digital information packets", U.S. Pat. No. 5,442,636 Issued Aug. 15, 1995] discloses a method that is aims at enforcing uniform inter-packet delay in an asynchronous packet switching network. The method describes a frame aligner circuit for aligning a plurality of information packet signals received within a maximum starting time variation interval consists of a plurality of frame detectors, stretch circuits and variable delay circuits which are controlled by a synchronization signal generator and a delay control circuit. This methods however, does not deal with switches that maintain a common time reference and cannot recover from temporary gradual increase in network delay. Also, this patent does not provide a method for signaling to establish a path of desired characteristics.

The international organization for telecommunication standards, ITU-T, completed in recent years a comprehensive set of documents for implementing multimedia (i.e., voice, video and data) and teleconferencing over the Internet. This standard is called H.323, which include among many other documents the following two: [ITU-T Visual telephone systems and equipment for local area networks which provide a non-guaranteed quality of service, ITU-T Recommendation H.323, 1996] and [ITU-T Line transmission of non-telephone signals: Control protocol for multimedia communication. ITU-T Recommendation H.245, 1994]. The H.323 has adapted the Internet's real-time protocol (RTP), see the following reference for more details: [H. Schultzinne et. al, RTP: A Transport Protocol for Real-Time Applications, IETF Request for Comment RFC1889, January 1996].

These and other aspects and attributes of the present invention will be discussed with reference to the following drawings and accompanying specification.

BRIEF DESCRIPTION OF THE DRAWINGS

FIG. 8 is a description of a capacity assignment table in the signaling controller, which maintains the assigned capacity for each time frame (TF) for all output ports of all switches. A triplet of variables is defined <Sl,Pm,TFn>, such that: Sl—the switch ID, Pm-the port ID, TFn—the time frame ID;

FIG. 11 is an example of a switch capacity table in the switch signaling controller for links of 155 MHz and time frames of 125 microseconds. Each cell in the table describes the capacity available at <Pm,TFn> such that: Pm-the port ID, TFn—the time frame ID;

FIG. 13 is a description of a setup protocol that involves a end-station, a signaling controller, and one or more switches;

FIGS. 14A and 14B are messages exchanged between the end-station and the signaling controller. The end-station sends to the signaling controller a request for schedule, and the signaling controller responds with a message accepting or rejecting the request;

FIGS. 15A and 15B are a link capacity status message and assign/release schedule message, respectively. Link capacity status message is sent from switch Sl to the signaling controller, where Pm-the port ID, TFn—the time frame ID. Assign/release schedule message is sent by the signaling controller sends to the switch signaling controller, and it contains: PID, Port-In, Port-Out, and multiple of (TF-In, TF-Out, capacity);

FIG. 18 is the specification of the algorithm for finding a schedule of S time frames, one for each switch on the route. The output of the algorithm is a binary indicator FOUND and an array Frame of S integers. If at the end of the algorithms FOUND=TRUE, Frame[s] contains the slot number of the schedule at the s-th switch along the route.

DETAILED DESCRIPTION OF THE PREFERRED EMBODIMENTS

Figure 1:
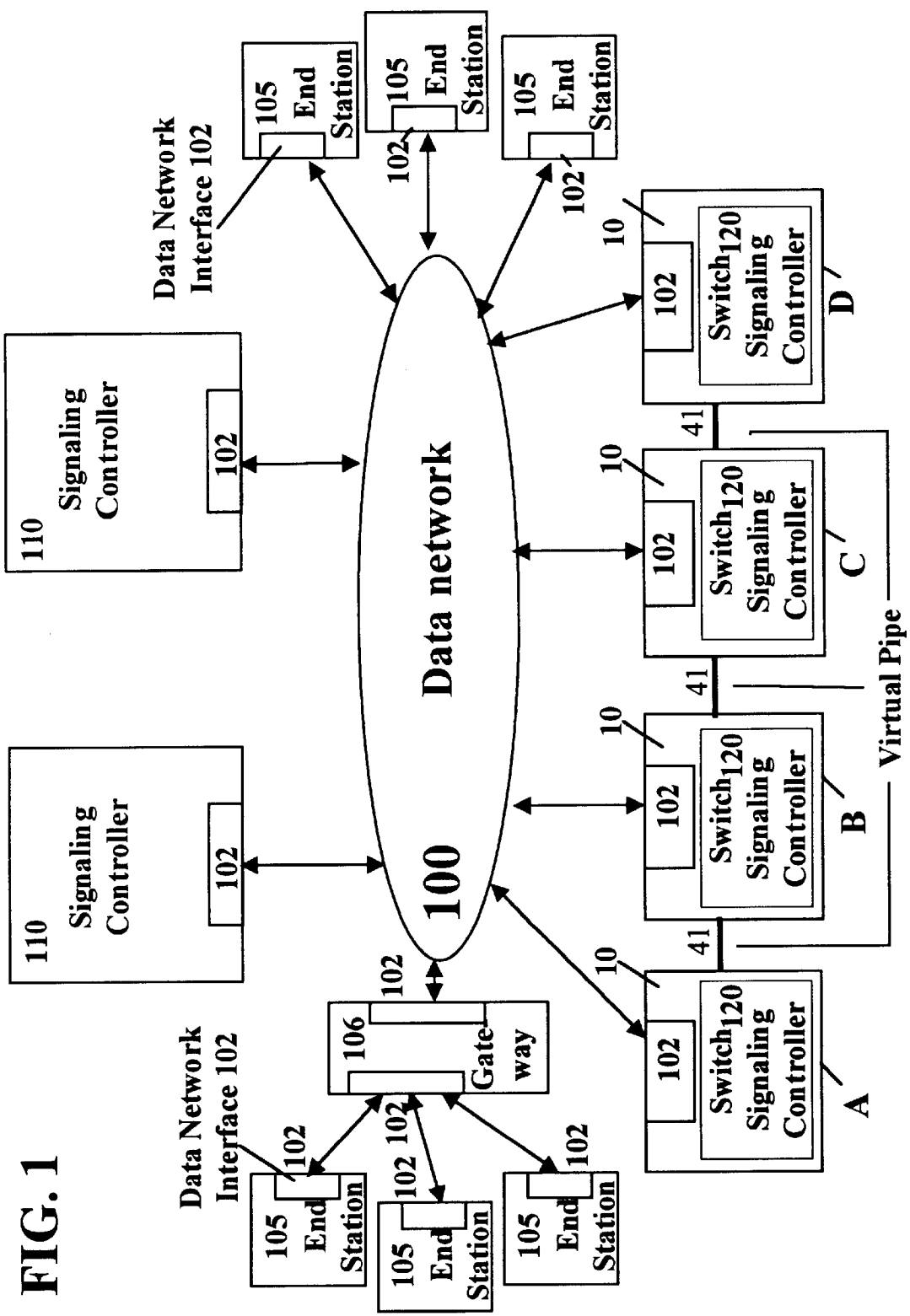
FIG. 1 is an illustration of a system comprising switch signaling controllers, end-station stations, gateways and signaling controllers, all exchanging signaling control packets over a data network through data network interface. The data network is separate from the network over which the data connections are established.

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

The following teaches a preferred design and implementation of the signaling system and methods disclosed in this invention. The signaling system is described as it is applied to a communication network in which the switches maintain a common time reference (CTR) wherein a data path is constructed as a virtual pipe, which comprises (1) a route of switches, and (2) a transmission schedule comprising a set of time frames in which the switches transmit and receive data packets.

The system is designed for transferring signaling messages across a data network with the objective of establishing and releasing virtual pipes, in which transmission time is reserved for data transfer at specified capacity while maintaining for the reserved data constant bounded jitter (or delay uncertainty) and no congestion-induced loss of data packets. Such properties are essential for many multimedia applications, such as, telephony and video teleconferencing.

Figure 5:
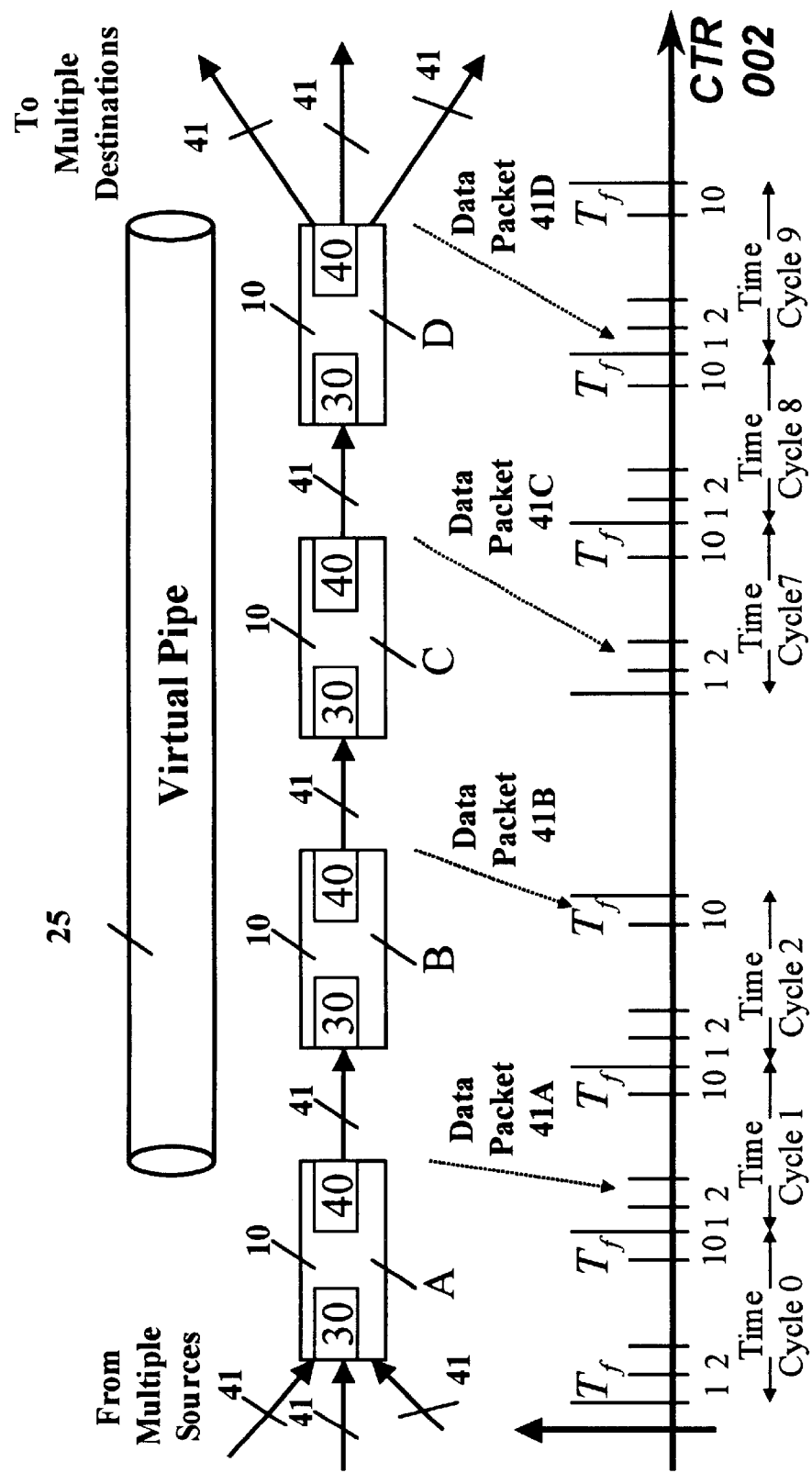
FIG. 5 is a schematic illustration of a virtual pipe and its timing relationship with a common time reference (CIR). Delay is determined by the number of time frames between the forward time out at Node A and the forward time out at Node D.

The objective of the design method and implementation disclosed in this invention is to enable exchange—over a general data network 100 like the Internet—of signaling messages among end-stations 105 or gateways 106, signaling controllers 110, and switch signaling controllers 120, as depicted in FIG. 1. The various signaling messages, which are specified below, are transferred to the data network via data network interfaces 102 in FIG. 1. The data network interfaces 102 are responsible for the reliable transfer of the signaling messages, which means that the receivers receive the message correctly and with no duplications. A known reliable transmission protocol used on the Internet is TCP. The sequences of signaling messages, shown in FIG. 13, are intended to specify, construct, and release plurality of virtual pipes 25, shown in FIG. 5. FIG. 5 depicts a virtual pipe 25 from the output port 40 of switch A, through switches B and C, and this virtual pipe ends at the output port 40 of node D. The virtual pipe 25 transfers data packets from at least one source to at least one destination.

The data packet transfers over the virtual pipe 25 switches 10 are designed to occur during a plurality of predefined time intervals, wherein each of the predefined time intervals is comprised of a plurality of predefined time frames. The timely transfers of data packets are achieved by coupling a common time reference 002 (CIR) signal to each of the switches 10.

Whereas the signaling system embodiment is described in the framework of a network in which switches maintain CTR and data transfer is accomplished along virtual pipes, the signaling system can also be applied to other types of networks, in which transmission of packets is governed by different regimes.

The Common Time Reference (CTR) 002

Figure 2:
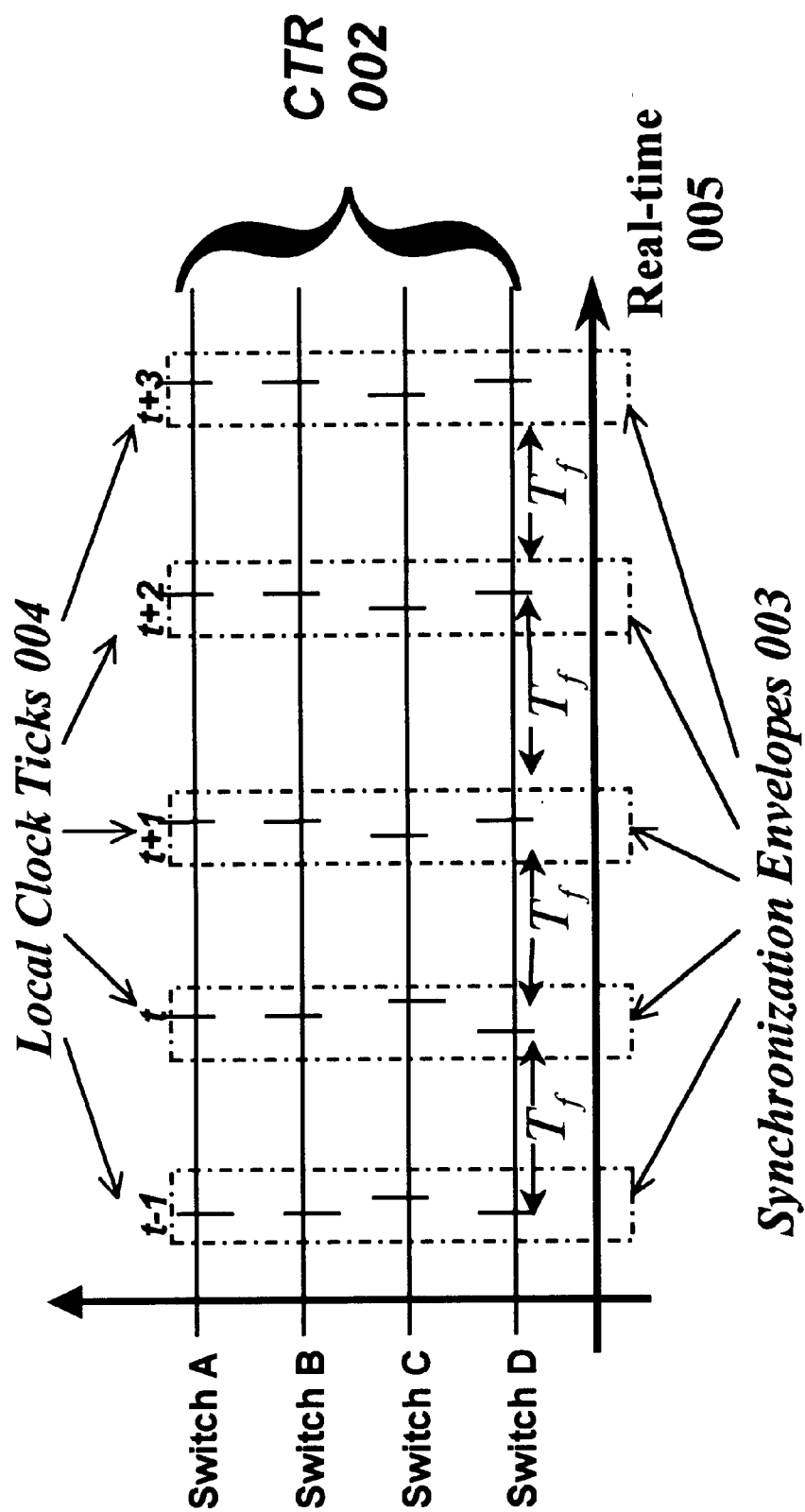
FIG. 2 is a diagram of how time is divided into time frames of a predefined duration, and the relationship among the local common time reference (CTR) on the switches, and how the multiplicity of local times is projected on the real-time axis.

As shown in FIG. 2, the common time reference 002 that is coupled to the switches 10 provides the following property: the local clock ticks 004, shown in FIG. 2, at all the pipeline switches (e.g., switches A, B, C, and D in FIGS. 5 and 6) when projected on the real-time axis 005 will all occur within predefined synchronization envelopes 003. In other words, the local clock ticks 004 occur within the synchronization envelopes 003, and therefore, outside to the synchronization envelopes all local clocks have the same clock value.

The common time reference is divided in a predefined manner into time frames, Tf, of equal duration, as shown in FIG. 2, typically Tf=125 microseconds. The time frames are grouped into time cycles. Each time cycle has predefined number of time frames.

Figure 3:
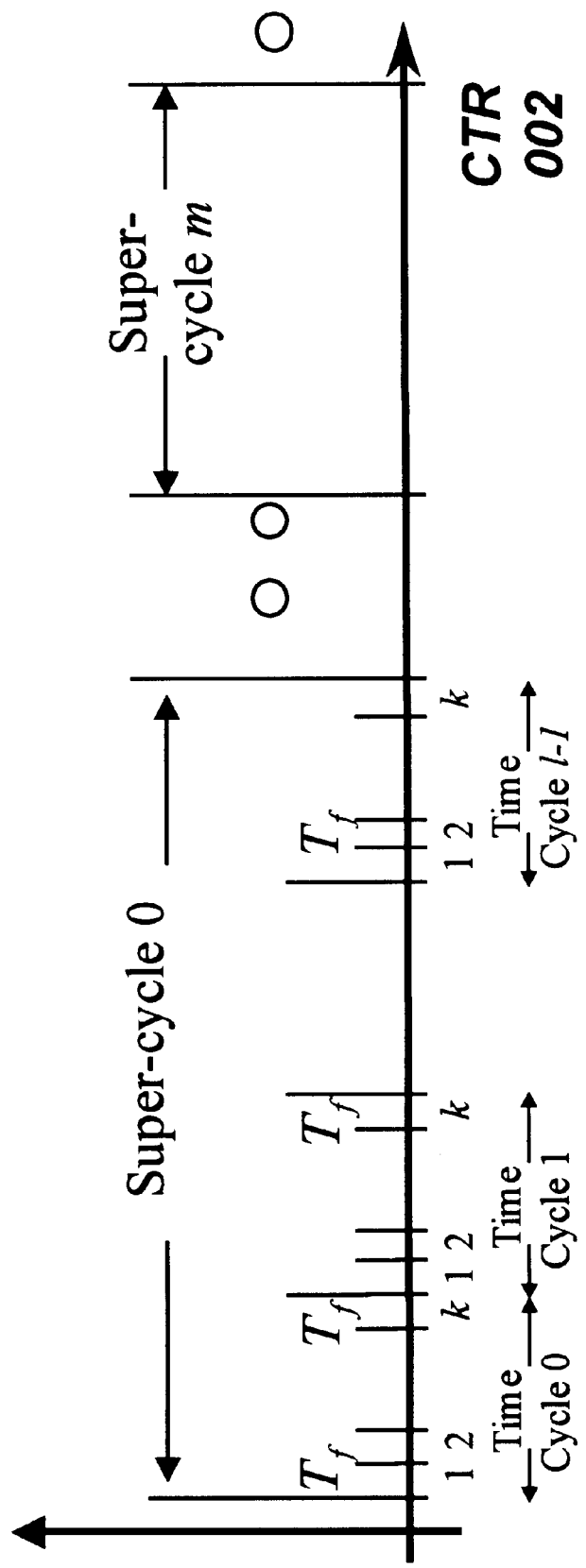
FIG. 3 is a schematic illustration of how the common time reference is organized into contiguous time-cycles of k time-frames each and contiguous super-cycle of l time-cycles each.

Referring to FIG. 3, there are k time frames in each time cycle. Contiguous time cycles are grouped together into contiguous super cycles, and as shown in FIG. 3, there are l time cycles in each super cycle.

Figure 4:
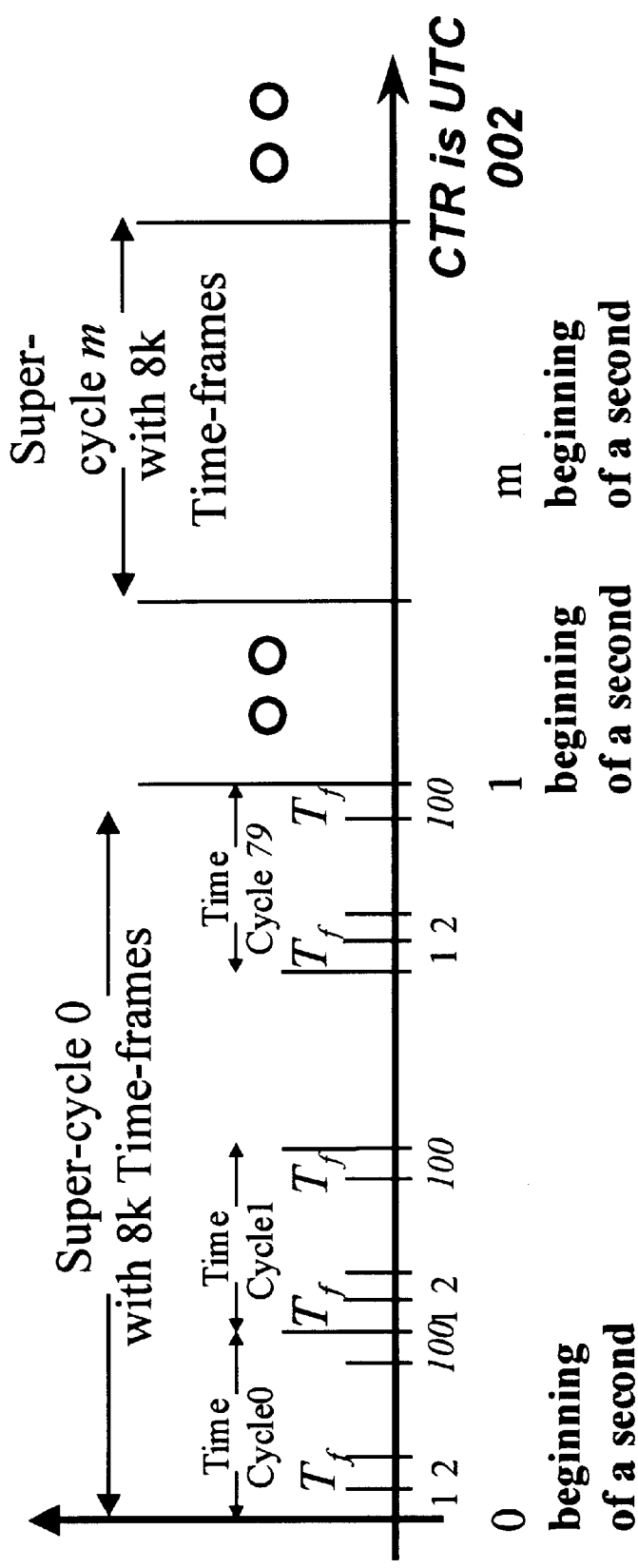
FIG. 4 is a schematic illustration of the relationship of the network common time reference and UTC (Coordinated Universal Time), such that, each time-cycle has 100 time-frames, of 125 microseconds each, and 80 time-cycles are grouped into one super-cycle of one second.

FIG. 4 illustrates how the common time reference can be aligned with the UTC (Coordinated Universal Time) standard. In this illustrated example, every duration of every super cycle is exactly one second as measured by UTC. Moreover, the beginning of each super cycle coincides with the beginning of a UTC second, as shown in FIG. 4. Consequently, when leap seconds are inserted or deleted for UTC corrections (due to changes in the earth rotation period) the cycle and super cycle periodic scheduling will not be affected.

The time frames, time cycles, and super cycles are associated in the same manner with all respective switches within the virtual pipe at all times.

Pipeline Forwarding

Pipeline forwarding relates to data packets being forwarded across a virtual pipe 25 with a predefined delay in every stage (either across a communication link 41 or across a switch 10 from input port 30 to output port 40). Data packets enter a virtual pipe 25 from one or more sources and forwarded to one or more destinations.

Figure 6:
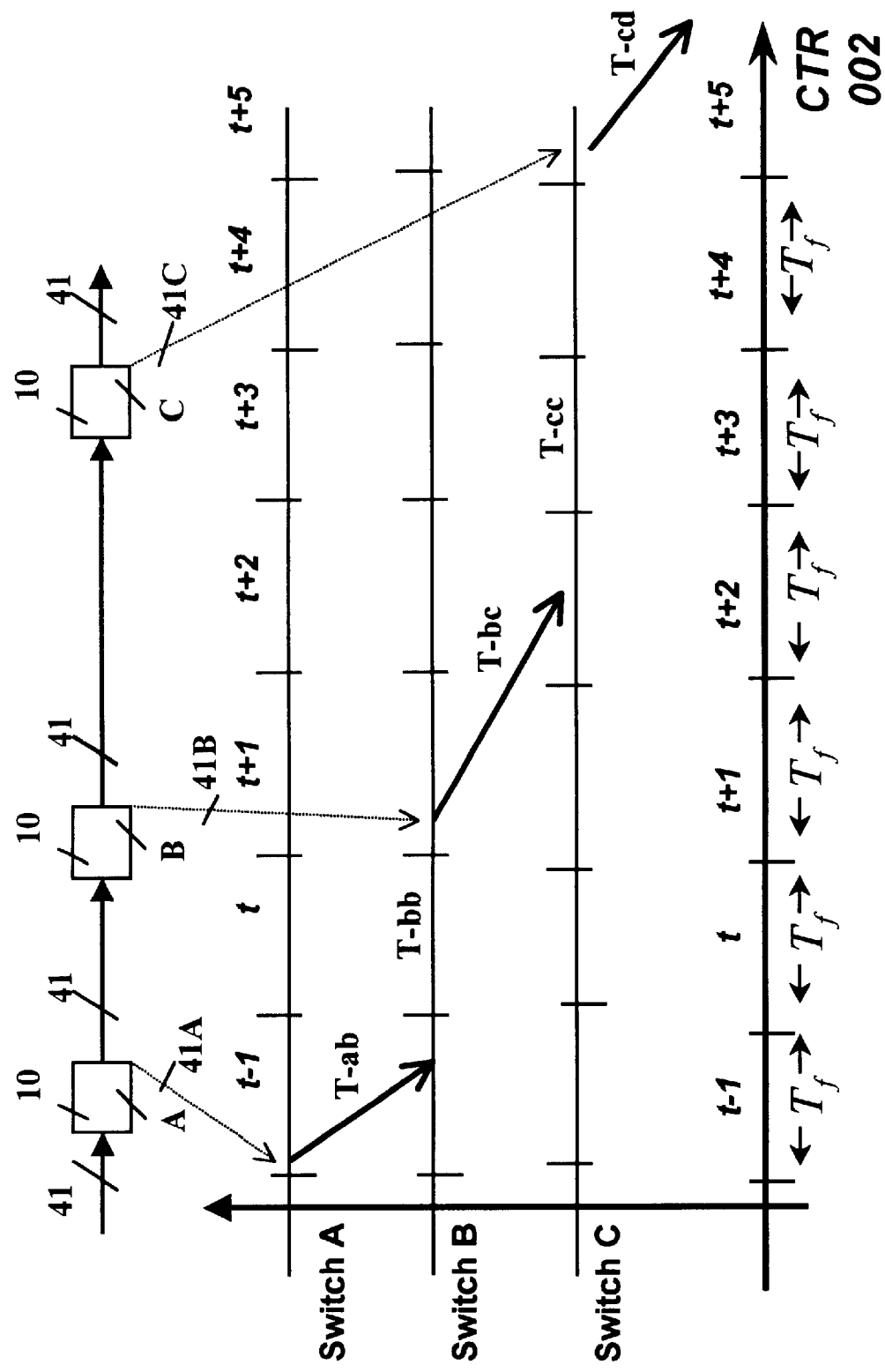
FIG. 6 is a schematic illustration of a data packet pipeline forwarding over a virtual pipe with common time reference (CTR)

This sort of pipeline forwarding used in accordance with the present invention is illustrated in FIG. 6. Data packet 41A is forwarded out of switch A during time frame t−1. This data packet 41A will reach switch B after a delay of T−ab. This data packet 41A will be forwarded out of switch B as data packet 41B during time frame t+1 and will reach switch C after a delay of T−bc. This data packet 41B will be forwarded out of switch C as data packet 41C during time frame t+5. Data packet 41C will reach switch D after a delay of T−cd. Consequently, the delay from the output of switch A to the output of switch C is 6=t+5−(t−1) time frames. As illustrated in FIG. 6, all data packets that are forwarded over that virtual pipe will have a delay of six time frames from the output of switch A to the output of switch C.

Referring again to FIG. 5, the timely pipeline forwarding of data packets over the virtual pipe 25 is illustrated. A data packet is received by one of the input ports 30 of switch A at time frame 1, and is forwarded along this virtual pipe 25 in the following manner: (i) the data packet 41A is forwarded from the output port 40 of switch A at time frame 2 of time cycle 1, (ii) the data packet 41B is forwarded from the output port 40 of switch B, after 18 time frames, at time frame 10 of time cycle 2, (iii) the data packet 41C is forwarded from the output port 40 of switch C, after 42 time frames, at time frame 2 of time cycle 7, and (iv) the data packet 41D is forwarded from the output port 40 of switch D, after 19 time frames, at time frame 1 of time cycle 9.

As illustrated in FIG. 5,
All data packets enter the virtual pipe 25 (i.e., forwarded out of the output port 40 of switch A) periodically at the second time frame of a time cycle, are output from this virtual pipe 25 (i.e., are forwarded out of the output port 40 of switch D) after 79 time frames.

The data packets that enter the virtual pipe 25 (i.e., forwarded out of the output port 40 of switch A) can come from one or more sources and can reach switch A over one or more input links 41.

The data packets that exit the virtual pipe 25 (i.e., forwarded out of the output port 40 of switch D) can be forwarded over plurality of output links 41 to one of plurality of destinations.

The data packets that exit the virtual pipe 25 (i.e., forwarded out of the output port 40 of switch D) can be forwarded simultaneously to multiple destinations, (i.e., multicast (one-to-many) data packet forwarding).

The communication link 41 between two adjacent ones of the switches 10 can be used simultaneously by at least two of the virtual pipes.

There can be multiple virtual pipes in the network, such that:

The multiple virtual pipes can multiplex (i.e., mix their traffic) over the same communication links.

The multiple virtual pipes can multiplex (i.e., mix their traffic) during the same time frames and in an arbitrary manner.

The same time frame can be used by multiple data packets from one or more virtual pipes.

Virtual Pipe Capacity Assignment

For each virtual pipe there are predefined time frames within which respective data packets are transferred into its respective switches, and separate predefined time frames within which the respective data packets are transferred out of their respective switches. Transmission capacity is reserved along a virtual pipe for a specific session by assigning time frames for transmission of data packets of the reserving session. Though the time frames of each virtual pipe on each of its switches can be assigned in an arbitrary manner along the common time reference, it is convenient and practical to assign time frames in a periodic manner in time cycles and super cycles, wherein a cycle is a finite sequence of contiguous time frames and a super cycle is a finite sequence of contiguous cycles.

In general, the bandwidth or capacity allocated for a virtual pipe is computed by dividing the number of bits transferred during each of the cycles by the cycle duration. In the case of a super cycle, the bandwidth allocated to a virtual pipe is computed by dividing the number of bits transferred during each of the super cycles by the super cycle duration.

A Signaling Controller

Figure 7:
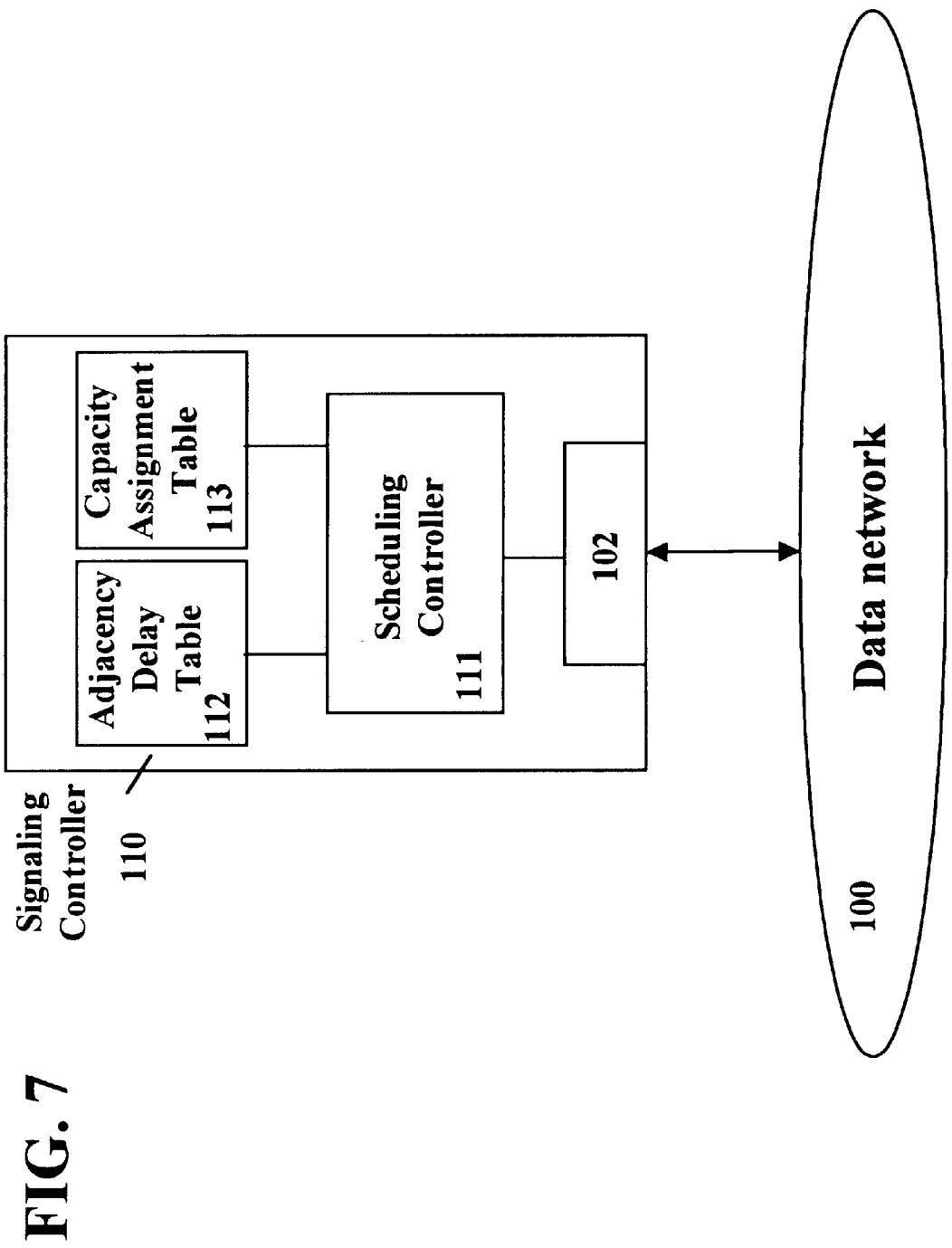
FIG. 7 is a functional description of the signaling controller, comprising (1) adjacency delay table that describes the network topology, (2) capacity assignment table that records assigned and free resources, (3) and a scheduling controller that computes schedules and communicates with switches to assign those schedules.
Figure 9:
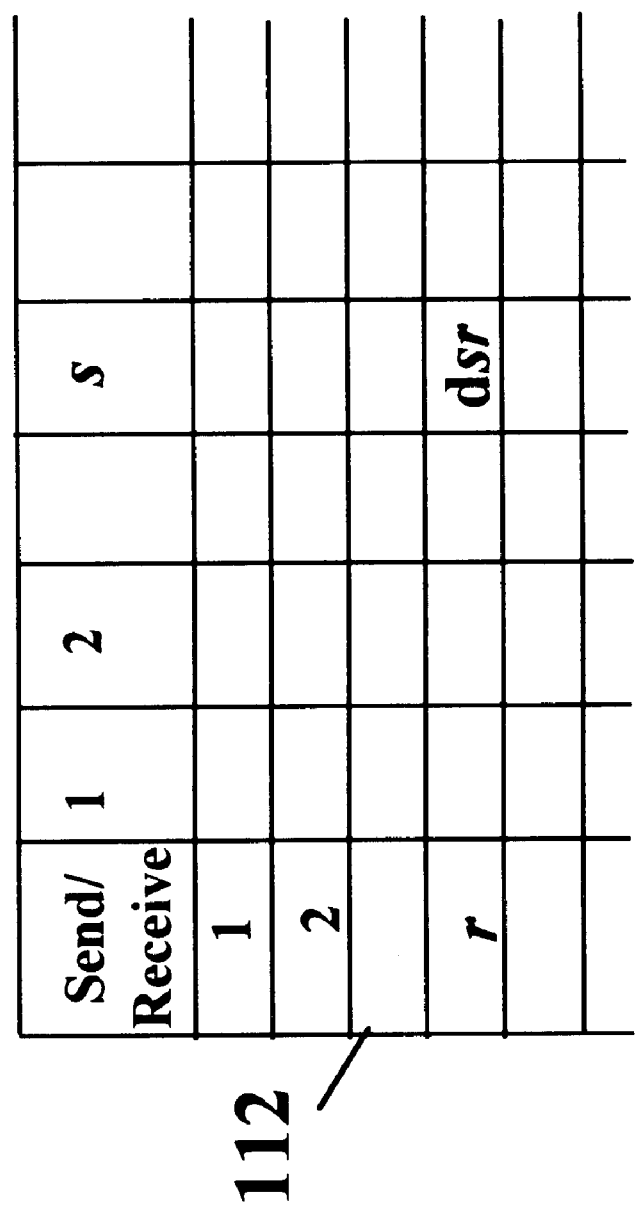
FIG. 9 is a description of an adjacency delay table, which contains delays, dsr (measured in time frames), between all adjacent switches in the network, where s is the sending switch and r is the receiving switch.

A signaling controller 110 is responsible for finding a virtual pipe including a route and a transmission schedule of time frames of predetermined capacity from a source to one or more destinations. FIG. 7 shows the signaling controller comprising (1) adjacency delay table 112, (2) capacity assignment table 113 and (3) schedule controller 111. The adjacency delay table 112 contains the information regarding the connectivity and delay between adjacent switches. The adjacency delay table 112 is a two-dimensional array in which each switch is represented by a row and a column, as shown in FIG. 9. A general entry in the adjacency delay table is dsr, which is the delay, expressed in time frames, from sending switch identification ID s, and receiving switch identification (ID) r.

In FIG. 9 we note:

An entry in the adjacency delay table, dsr=∞ means that switch s cannot send data packets to switch r directly. In the preferred embodiment the symbol ∞ is represented by a large integer, D, number that is greater than the largest delay between any two adjacent switches.

An entry in the adjacency delay table, dsr<D, means that switch s can send data packets to switch r in a path that does not traverse any other switch. These path are denoted as inter-switch communication links 41 in FIG. 1. In different embodiments the data paths from switch s to switch r may be through a direct physical link connecting the two switches or a data path through an independent network like the Internet.

FIG. 9 depicts the adjacency delay table with indexes as contiguous integers, starting from 1. A preferred embodiment of these indexes is to use that actual switch IDs.

The capacity assignment table 113, in FIG. 8, contains information about total and available capacity at each switch and each output port FIG. 8 describes the capacity assignment table 113, which has a row for each output port of each switch. The column Capacity specifies the number of bytes that can be transmitted on each time frame of the output port, and for each time frame on that output port, the corresponding column specifies the number of bytes that can still be reserved for virtual pipes. The general entry in the capacity assignment table is C(Sl,Pm,TFn), such that C is the available capacity in switch ID Sl, port ID Pm, and time frame ID TFn. For example, the second row in the table 113 shows that it represents switch 2, output port 1, which has a capacity of 2400 bytes per time frame. This output port has an unassigned capacity of 1250 bytes in time frame 1 of a cycle.

The schedule controller 111 uses the information in the adjacency delay table and the capacity assignment table to compute virtual pipes 25 in terms of the plurality of switches the virtual pipe traverses and the frames in which packets of this virtual pipe are transmitted by each switch on the virtual pipe. The input to this computation is a specification of source and destination switches and transmission capacity to reserve along the virtual pipe. The output of the computation is an ordered list of adjacent switches that form a route from the source to the destination switches, and a transmission schedule comprising at least one time frame for each switch in which the data packets of the virtual pipe are transmitted by the respective switches. The output also includes at least one time frame for each switch, in which data packets are scheduled to arrive from the previous switch in the route.

Figure 16:
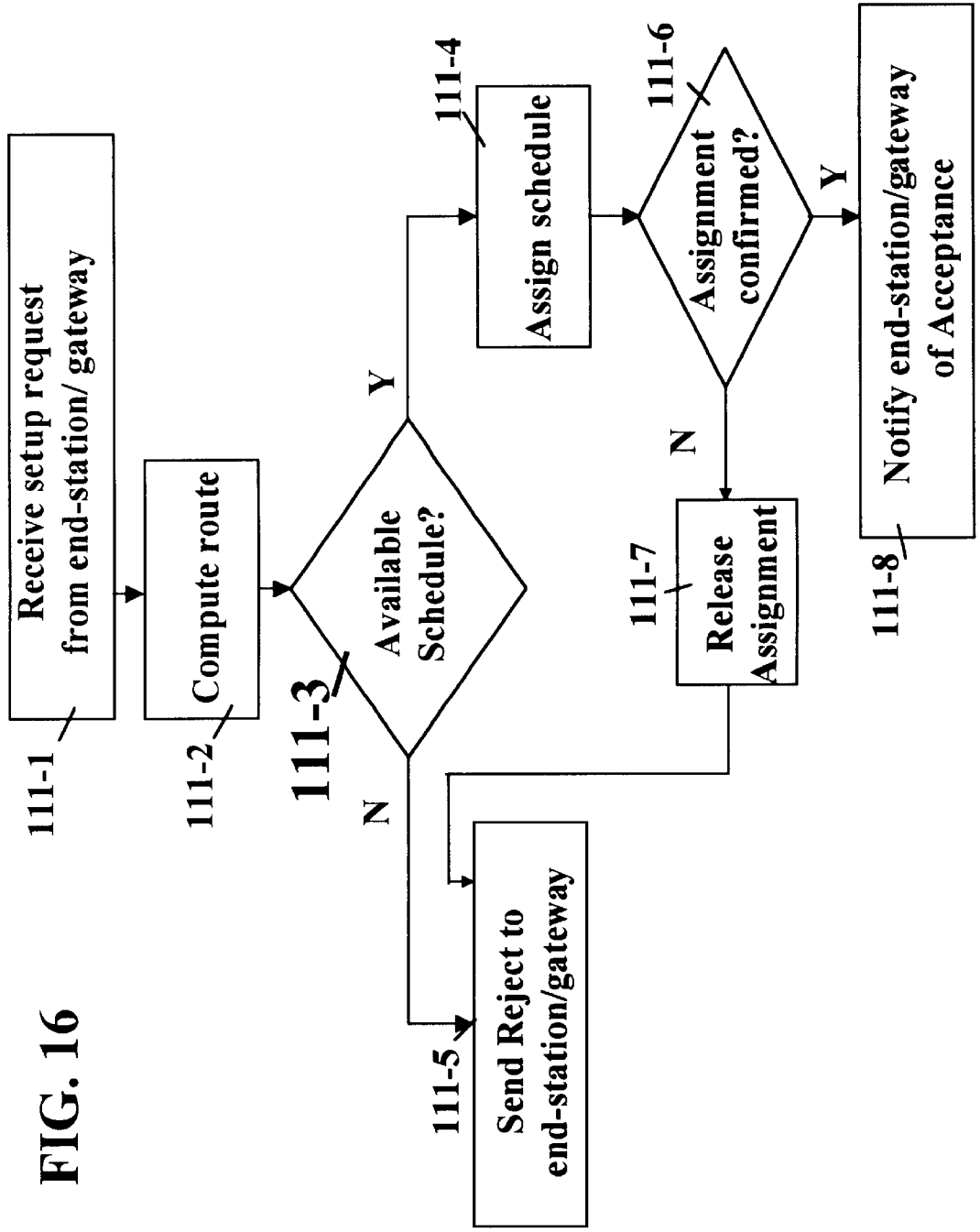
FIG. 16 is a query-assignment procedure executed by a scheduling controller as part of the signaling controller.

The signaling scheduler computes the route, see 111-2 in FIG. 16, for the virtual pipe using the entries in the adjacency delay table. A preferred embodiment of the route computation is by one of the following algorithms: Dijkstra's minimum cost path algorithms, Bellman-Ford shortest path algorithm, see for example, [M. Schwartz, Telecommunication Networks: protocols, modeling, and analysis. Addison Wesley, Reading MA. 1987] and [C. Huitema, Routing in the Internet, Prentice Hall, 1995].

Given the route obtained in the last step, the schedule controller executes a scheduling algorithm, see 111-3 in FIG. 16, for finding a transmission schedule that matches the required transmission capacity for the virtual pipe. The objective of the scheduling algorithm is to find a transmission schedule—comprising of M time frames ($M \geq 1$) at each switch along the route so that the total available capacity in the time frames at each switch is at least the transmission capacity that is requested for the virtual pipe. The output of the algorithm comprises M ordered lists of time frames, such that in each list the m-th entry is the time frame in which the m-th switch on the route is scheduled to transmit a data packet.

Figure 17:
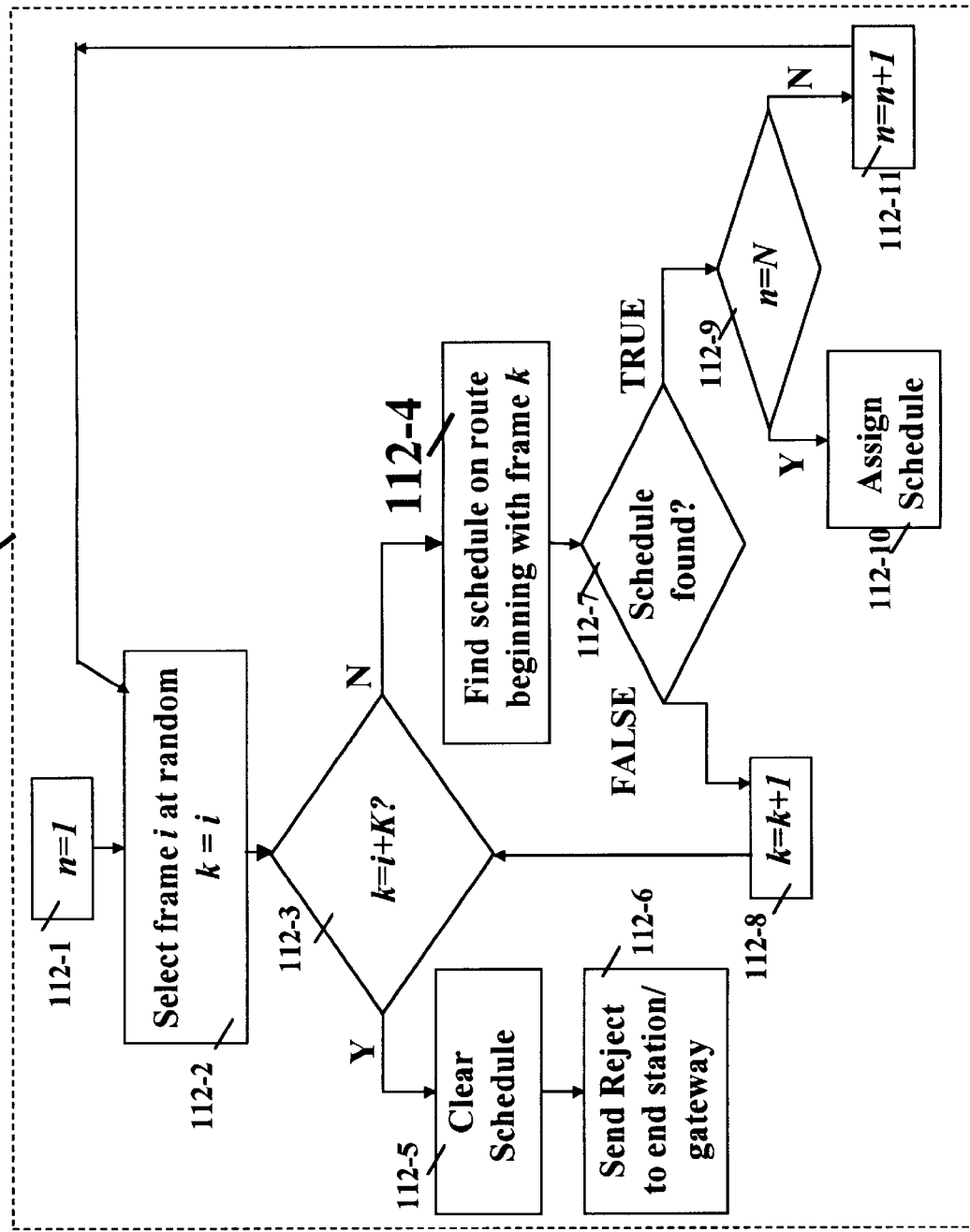
FIG. 17 is a schedule computing procedure on the scheduling controller as part of the signaling controller.

A preferred embodiment of the algorithm for computing transmission schedule along the route is described in FIGS. 17 and 18. The algorithm in FIG. 17 consists of N iterations, see 112-2 in FIG. 17, one for each unit of capacity that can be accommodated in a single time frame. An iteration begins with the first switch on the route in which a time slot is selected at random. From that time slot, say k, see 112-4 in FIG. 17, a complete schedule is build along the path, according to the single-frame schedule finding algorithm in FIG. 18. If the single frame schedule finding algorithm terminates unsuccessfully, that is, a list of time frames comprising a complete schedule along the path is not found, a new schedule is attempted starting from time frame k+1, see 112-3 in FIG. 17. If K attempts like this fail, where K is the number of time frames in a cycle, the scheduling algorithm terminates in failure and the request for a virtual pipe is rejected, see 112-6 in FIG. 17.

If a schedule is found starting from time frame j, a new iteration begins with random selection of a time frame to start a new schedule. The scheduling algorithms continues for N iterations, see 112-9 in FIG. 17. If all iterations are successful, the scheduling algorithm terminates successfully, see 112-10 in FIG. 17, and provides as output a set of schedules, comprising time frames for each switch to receive data packets from its predecessor on the route and transmit packets to its successor. That is, for each switch on the route there is a list of time-frame pairs {TFi-in and TFi-out}, as also shown in the table in FIG. 12, wherein packets that are received in TFi-in are transmitted in time frame TFi-out (i varies from 1 to M). Otherwise, upon the first failing iteration, the schedule is considered infeasible and a reject message is sent.

FIG. 18 is a pseudo code specification of a preferred embodiment of the single-frame schedule finding algorithm for finding a schedule of S time frames, one for each switch on the route. This algorithm finds a schedule that represent a unit capacity, which constitutes a single iteration in the schedule finding algorithm that is described above. The algorithm begins at the first switch on the route at time frame l=k, where k is the time frame selected by the scheduling algorithm for this iteration. If time frame has sufficient available capacity, the algorithm examines time frame l2=k+d1,2+1 for available capacity. In the general i th step, after the successful finding of i−1 time frames, the algorithms examines time frame li=k+di−1,i+1 for available capacity. If this time frame is unavailable, the algorithms tries time frame lI+1. If this time frame is available, the algorithm continues on to the next step. Otherwise, the algorithm fails and exits with FOUND=FALSE.

In FIG. 18, the output of the single-frame schedule finding algorithm is a binary indicator FOUND and an array Frame of S integers. If at the end of the algorithms FOUND=RUE, Frame[s] contains the slot number of the schedule at the s-th switch along the route. If FOUND=FALSE, the algorithm fails to find a schedule and it is considered as terminated in failure.

At the successful termination of the algorithm in FIG. 18, the information in the array Frame is sufficient to construct a single time-frame schedule in a format that is suitable for the assignment message of FIG. 15B. The switch IDs are those of the S switches on the route. For s=1 to S, Frame[s] is the TF-out for the corresponding switch ID. For s=2 to S the TF-in equal Frame[s−1]+ds−1,s.

Figure 10:
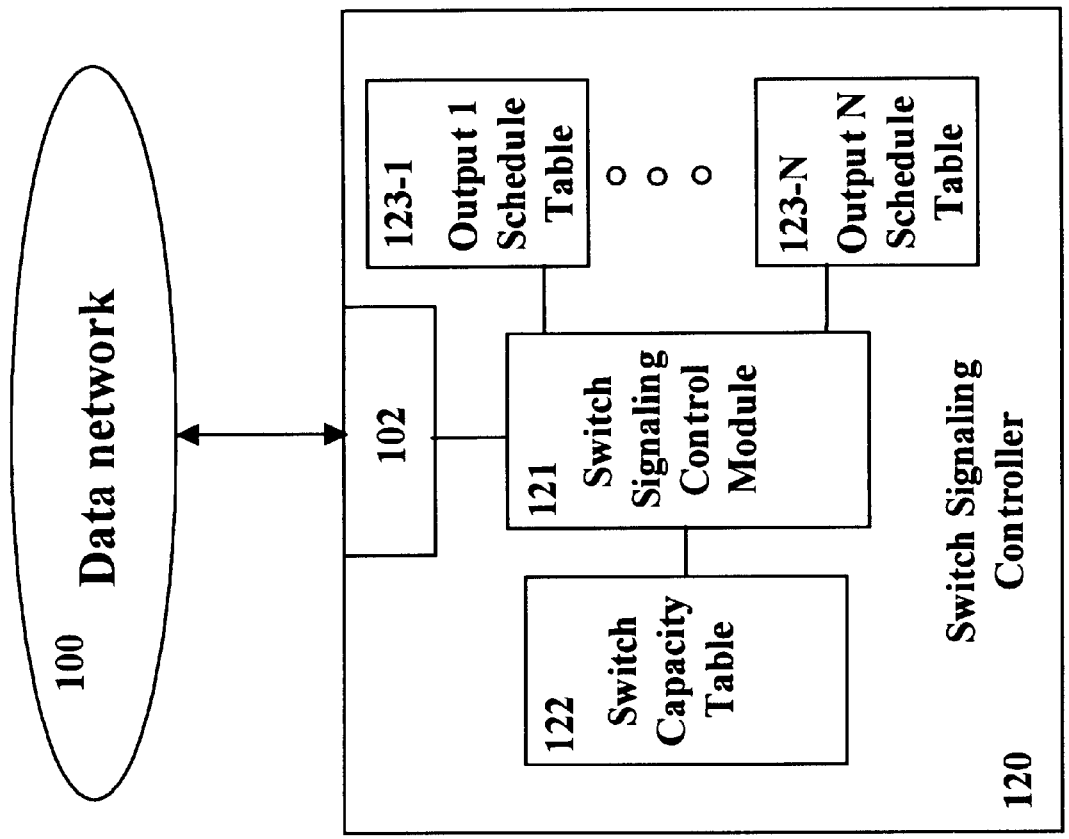
FIG. 10 is a functional description of the switch signaling controller, comprising (1) switch capacity table, (2) output schedule tables, and (3) switch signaling control module.

The Switch Signaling Controller—FIG. 10

Figure 12:
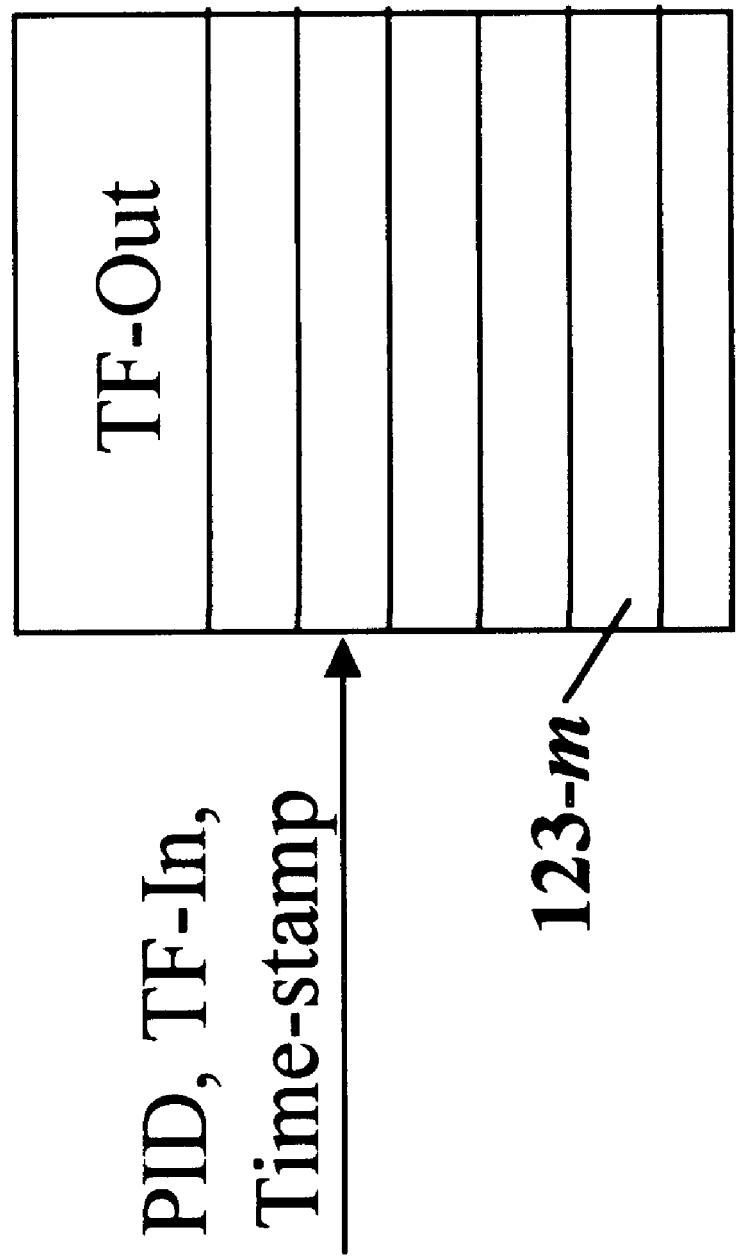
FIG. 12 is a description of an output scheduling table in the switch signaling controller. A switch signaling controller maintains an output scheduling table for every output port. Each entry in a table specifies a virtual pipe ID (PID), time frame in (TF-In), the table provides the scheduled time frame out (TF-Out)

The switch signaling controller 120 resides inside each switch 10 and comprises switch capacity table 122, shown in FIG. 11, shown in FIG. 12, switch signaling control module 121, and a plurality of N output schedule tables 123-1 to 123-N, one for each of the N output ports of the switch 10. The switch signaling control module 121 reads from and writes into the switch capacity table 122 and output schedule tables 123-1 to 123-N. The switch signaling control module 121 receives signaling messages requesting reservation and release of capacity in plurality of time frames, and sends signaling messages confirming reservation and release of capacity in time frames and reporting status of reserved capacity in the plurality of time frames in the switch 10 output ports;

FIG. 11 is an example of a switch capacity table 122 in the switch signaling controller 120—for links of 155 MHz and time frames of 125 microseconds. An output port has a capacity of 2400 bytes per time frame. A typical entry, C(Pm,TFn) is the available capacity at Port ID Pm, and time frame ID TFn, expressed in bytes. The entry C(2,2)=2220 indicates that 180 bytes are reserved in this port and the other 2220 are available for future reservations.

FIG. 12 describes an output scheduling table 123-m in the switch signaling controller 120. There is a table for every output port with an entry for a virtual pipe ID (PID) and time frame in (TF-In), the table provides the scheduled time frame out (TF-Out).

The Signaling Protocol—FIG. 13

The signaling protocol comprises (1) messages that are sent and received by the end-stations 105, gateways 106, signaling controller 110, and switch signaling controller 120, (2) procedures whereby received messages are processed. The messages are the means whereby end-stations request transmission capacity, signaling controllers compute virtual pipes and convey the results of the computation by creating virtual pipes or rejecting the request, and switch signaling controllers assigning transmission capacity in their output ports and confirm or reject the assignment order. The objective of the signaling protocols is to enable the creation of virtual pipes in a communications network wherein the switches maintain a common time reference. The following describes a preferred embodiment of a signaling protocol. The messages are depicted by FIGS. 14 and 15 and the order by which messages are sent and responded to is described in FIG. 13.

FIG. 14A describes the structure of the setup request message, which contains the following fields: source ID, destination ID, request ID, signaling controller ID, and a specification of requested virtual pipe. In this preferred embodiment, the request description is the capacity in bits per seconds requested by the end-station 105 or via a gateway 106. The source ID and the destination ID specify the first and last switches on the route, respectively. In the preferred embodiment, the end-station send the setup request to a signaling controller. The signaling controller ID can be the identification of a specific signaling controller— e.g., IP address—or a generic name describing the function of a signaling controller. In the latter case, the message is guaranteed to arrive to one of the signaling controllers that are in service in the network.

The response to the setup request message is a setup accept message, depicted in FIG. 14B. The message contains a field that identifies the request ID and is sent by the signaling controller that processes the request by attempting to compute a virtual pipe that corresponds to the specifications in the setup request. If a virtual pipe is found, the signaling controller responds with a setup accept message in which the reject/accept field is set to accept. On the other hand, if the algorithms for computing virtual pipe fails, the signaling controller sets the reject/accept field in the message to accept.

FIG. 15 depicts messages that are exchanged between the signaling controller and a switch signaling controller. FIG. 15A describes the capacity status update message, which the switch signaling controller sends to the signaling controller. The message has a field that identifies the switch that sends the message and K*N capacity fields, one for each of the K time frames in a cycle and N output ports in a switch. The field <Pm,TFn> contains C(Pm,TFn), which represents the capacity in bytes available for reservation in switch ID Sl, output port ID Pm, time frame ID TFn.

FIG. 15B describes a capacity assignment message which a signaling controller sends to a switch signaling controller. The fields switch ID and PID identify the switch to which the packet is sent and the pipe ID, respectively. The data fields in the capacity assignment message specify pairs of input and output frames in which the switch receives and transmits, respectively, as many bytes as specified in the corresponding capacity field.

FIG. 15C shows the structure of the assignment confirmation message which a switch signaling controller sends to the signaling controller in response to a received schedule assignment message. If the assignment is successful, i.e., the switch signaling controller updates its capacity table 122 and output schedule table 123-m, the switch signaling controller set the confirmation/denial field to confirmation. Otherwise, the switch signaling controller sets the field to denial to indicate that the tables were not updated, hence the request schedule was not established.

FIG. 13 depicts an embodiment of the sequence whereby the aforementioned messages are sent. Every predetermined time period, or upon predetermined specific events, switches send to one or more signaling controllers a capacity status update message, an embodiment of which is depicted in FIG. 15A. A capacity status message can be sent in one of the following manners: (1) to a specific signaling controller by a reliable or unreliable unicast protocols, like TCP or UDP, respectively, (2) to multiple signaling controllers that listen on a P multicast address by sending a message to that address. The multicast transmission can be reliable or unreliable. If the transmission protocol, unicast or multicast, is reliable, the capacity update message contains only updates from last transmission, and therefore can be much smaller than a message with a full update, which is sent under unreliable protocol.

In this preferred embodiment, an end-station initiates the establishment of a virtual pipe by sending a setup request message, as depicted in FIG. 13. A signaling controller that receives a setup request message, responds by computing a virtual pipe comprising a sequence of switches that form a route to the desired destination, and a schedule of time frames over which the packets of this virtual pipe are transmitted. The computation of the schedule is done according to the procedures described in FIGS. 16, 17, and 18. If the signaling controller does not succeed in finding a transmission schedule, it sends to the end-station a setup accept message, the structure of which is shown is FIG. 14B and in which the reject/accept field is set to Reject.

If the signaling controller finds a transmission schedule that satisfies the setup request, it sends a capacity assignment message as depicted in FIG. 15B to at least one switch on the virtual path. A switch responds to a capacity assignment message by an assignment confirmation message as depicted in FIG. 15C, wherein the confirmation denial field is set to confirmation is the assignment is successful, and to denial if the switch cannot assign the capacity. The signaling controller responds to a denial of an assignment by sending a setup accept message, the structure of which is shown is FIG. 14B and in which the first field is set to Reject. The signaling controller also sends a capacity assignment message, depicted in FIG. 15B, to the switches to which it sent the assignment message, wherein the assign/release field is set to release.

The signaling controller responds to a confirmation message by sending an accept message to the end-station 105 or to the gateway 106—the gateway will forward the message to an end-station, in which the reject/accept field is set to accept. The procedure performed by the signaling controller is depicted schematically in FIGS. 16–18.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A system for exchanging signaling messages on a data network for the purpose of controlling transfer of data packets, the system comprising:
    a plurality of end-stations, each having a data network interface;
    a plurality of signaling controllers, each having a data network interface;
    a plurality of switches, coupled via a plurality of inter-switch communication links;
        wherein each switch is further comprised of a data network interface and a switch signaling controller;
        wherein each said switch is further comprised of a plurality of uniquely addressable input ports and output ports which are coupled to one another via the plurality of inter-switch communication links for the transfer of data packets within a plurality of predefined time intervals;
        wherein the end-stations, the plurality of signaling controllers, and the plurality of switches all communicate over the data network via the respective data network interfaces; and
        wherein the transfer of the data packets among the plurality of switches via the plurality of inter-switch communication links is provided during respective ones of the plurality of predefined time intervals, wherein each of the predefined time intervals is comprised of a plurality of predefined time frames.

2. The system as in claim 1, wherein each of the switches is coupled to receive a common time reference signal;
    wherein each of the data packets is forwarded between a predefined plurality of selected ones of the switches during a predefined sequence of time frames for transfer of the data packets, comprising in combination a virtual pipe;
    wherein said virtual pipe couples data packets from at least one source and sends data packets to at least one destination.

3. The system as in claim 2, wherein the plurality of switches transfer data packets between specific ones of the sources and destinations at predefined time frames in the predefined time sequence.

4. The system as in claim 3, wherein the predefined sequence is maintained in memory as a list of switches and respective related lists of time frames.

5. The system as in claim 2, wherein the signaling controller is responsive to a setup request message to establish the virtual pipe.

6. The system as in claim 2, wherein the common time reference signal coupled to each of the switches comes from GPS (Global Positioning System).

7. The system as in claim 2, wherein the common time reference signal coupled to each of the switches conforms to the UTC (Coordinated Universal Time) standard.

8. The system as in claim 2, wherein the forwarding of data packets between selected ones of the switches in predefined time intervals is determined responsive to the common time reference signal.

9. The system as in claim 1, wherein the predefined interval is comprised of a fixed number of contiguous time frames comprising a time cycle.

10. The system as in claim 9, wherein the time cycles are contiguous.

11. The system as in claim 10, wherein a fixed number of a plurality of contiguous ones of the time cycles comprise a super cycle;
    wherein the super cycle is periodic.

12. The system as in claim 11, wherein the super cycle duration as measured using the UTC (Coordinated Universal Time) standard is equal to at least one of the following: one second, a plurality of seconds and a fraction of a second.

13. The system as in claim 1, wherein the inter-switch communication links that are coupling the switches are part of the said data network.

14. The system as in claim 1, wherein the inter-switch communication links that are coupling the switches are distinct from the data network.

15. The system as in claim 1, wherein the signaling controller operation is distributed in at least one of the switches and one of the end-stations.

16. The system as in claim 1, wherein the data network is comprised of a plurality of nodes;
    wherein at least one of the signaling controllers is distributed in at least one node distinct from the end-stations and the switches.

17. The system as in claim 1, further comprising a plurality of gateways, each having a plurality of data network interfaces and a plurality of uniquely addressable input and output ports.

18. The system as in claim 17, wherein the signaling controller is distributed at least one of the gateways.

19. The system as in claim 17, wherein at least one pair of input and output ports of the gateway is connected to at least one of the end-stations via one of the data network interfaces.

20. The system as in claim 1, wherein the data network is based on the Internet .protocol (IP) protocol.

21. The system as in claim 1, wherein the data network is at least one of the following: intranet network, extranet network, frame relay network, asynchronous transfer mode (ATM) network and an-optical network "wherein transmission of data packets is done over optical fiber and wherein switching of data packets is performed utilizing optical switches" has been inserted after the term "network".

22. A system for exchanging signaling messages for the purpose of controlling data packets transfer over a data network, the system comprising:
    a plurality of end-stations, each having a data network interface;
    a plurality of gateways, each having a data network interface;
    a plurality of signaling controllers, each having a data network interface; and
    a plurality of switches, each having a data network interface;
        wherein each switch further comprises a switch signaling controller and a plurality of uniquely addressable input and output ports;

wherein the input ports and output ports are coupled to one another via a plurality of inter-switch communication links for transferring data packets within predefined time intervals;

wherein the plurality of end-stations, the plurality of gateways, the plurality of signaling controllers and the plurality of switches all communicate via the data network via their respective data network interfaces;

wherein each of the switches is coupled to receive a common time reference signal;

wherein the common time reference is comprised of a plurality of predefined time frames;

wherein a fixed number of contiguous time frames each comprises a time cycle;

wherein the time cycles are contiguous; and wherein the signaling messages mark the time frames during which data packets will be forwarded between selected ones of the switches during specific predefined time frames.

23. The system as in claim 22, wherein the signaling messages are further comprised of at least one of:

a plurality of setup request messages sent from the end-stations and the gateways to at least one of the signaling controllers;

a plurality of request accept/reject messages sent from the signaling controller to at least one of the end-stations and the gateways;

a plurality of capacity status update messages sent from the switches to at least one of the signaling controllers;

a plurality of capacity assign/release schedule messages sent from the signaling controller to at least one of the switches; and a plurality of assignment confirmation/denial messages sent from the switches to at least one of the signaling controllers.

24. The system as in claim 23, wherein a reliable transmission protocol is used for sending and receiving the signaling messages via the data network interfaces.

25. The system as in claim 24, wherein the data network interface uses the Internet transport control protocol (TCP) for reliable transmission protocol for sending and receiving the signaling messages.

26. The system as in claim 23, wherein the switch signaling controller further comprises a switch capacity table comprising information representative of available capacity for every time frame within every time cycle; and wherein each of the switch signaling controllers is responsive to the information in the switch capacity table and outputs a capacity status update message for the respective switch for each output port and for each time frame within the time cycle.

27. The system as in claim 26, wherein the switch capacity table contains information of transmission capacity available for the time frames for each of the plurality of input ports.

28. The system as in claim 26, wherein the switch signaling controller further comprises a plurality of output schedule tables, each for a respective one of the output ports;

wherein each of the output schedule tables contains information representative of time frames when data packets are scheduled to be received and time frames where said data packets are scheduled to be transmitted out of the output port of said switch.

29. The system as in claim 23, wherein the signaling controller further comprises an adjacency delay table, wherein the adjacency delay table contains information representative of transmission delay between two defined ones of said switches; and a capacity assignment table containing information representative of available capacity in each of the plurality of output ports for at least one of said switches and for each of the time frames within the time cycle.

30. The system as in claim 29, wherein the capacity assignment table is updated responsive to the capacity status update messages received from the switch signaling controller.

31. The system as in claim 29, wherein a scheduling controller is responsive to the capacity assignment table and the adjacency delay table for computing and outputting a capacity assign/release schedule message.

32. The system as in claim 23, wherein the gateway that sends the setup request message is responsive to setup request message received from at least one of the end-stations.

33. The system as in claim 28, wherein the switch signaling controller is responsive to the capacity assign/release schedule messages for specific time frames within time cycles for at least one of its output ports to set values in at least one of its output schedule tables.

34. The system as in claim 33, wherein the switch signaling controller is responsive to the capacity assign/release schedule message for setting values in its switch capacity table.

35. The system as in claim 29, wherein the signaling controller is responsive to the capacity status update message received from the switch signaling controller, for updating at least one value in a respective one of the capacity assignment tables.

36. The system as in claim 23, wherein the capacity status update message is sent responsive to at least one of the following: periodic time-out events, predetermined events and the capacity status request message received from the signaling controller.

37. A signaling controller system for coupling to a data network for receiving setup request messages from a plurality of end-stations and gateways, for receiving capacity status update messages for each of a plurality of output ports for each of a plurality of switches coupled to the data network;

wherein each of the switches is coupled to receive a common time reference signal, wherein the common time reference is comprised of a plurality of predefined time frames, wherein a fixed number of contiguous time frames comprises a time cycle, wherein the time cycles are contiguous; and wherein the switches transfer data packets during specific time frames, the signaling controller system further comprising:

an adjacency delay table for storing a predefined associated delay between a respective pair of switches;

a capacity assignment table for storing available capacity for each of the respective specific time frames for each of the respective output ports for each of the respective switches, responsive to the capacity status update messages from the plurality of switches, and a scheduling controller responsive to the setup request message, to the adjacency delay table and to the capacity assignment table for assigning selected ones of the specific time frames for the transfer of respective associated ones of the data packets via respective specific ones of the output ports of respective ones of the switches.

38. The system as in claim 37, wherein the signaling controller receives the setup request messages from one of the end-stations and gateways and sends the request accept/ reject message with transmission information representative of a specific one of the predefined time frames for transfer of the data packets by at least one of the end-stations and gateways.

39. The system as in claim 38, wherein the setup request messages are sent from the end-stations to the gateways which then forward the setup request messages to the signaling controller;
wherein the signaling controller is responsive thereto and sends the request accept/reject messages to the gateways which forwards the request accept/reject messages to the end-stations.

40. The system as in claim 37, wherein the signaling controller is responsive to the setup request message for computing at least one schedule of time frames during which at least one of the switches will receive and transmit data packets.

41. The system as in claim 40, wherein a capacity assign/release message is comprised of the schedule of time frames;
wherein the capacity assign/release message assigns predefined capacity for predefined time frames;
wherein the schedule of time frames is stored as fields of the capacity assign/release message.

42. The system as in claim 40, wherein the schedule of time frames identifies specific ones of the input and output ports and the associated time frames for input ports to receive and output ports to transmit.

43. A system as in claim 37, wherein the schedule of time frames is determined by first selecting a route followed by computing a schedule of available time frames in the switches along the route.

44. The system as in claim 41, wherein the signaling controller computes a plurality of schedules of time frames in which at least one switch will receive and transmit data packets;
wherein the signaling controller selects one of the schedules obtained from the computation and sends the selected schedule in one of the capacity assign/release messages.

45. The system as in claim 40, wherein the signaling controller determines the selection of one of the schedules of time frames so that the maximum of the capacity previously assigned during respective one of the plurality of the time frames is minimized.

46. The system as in claim 37, wherein the signaling controller updates the capacity assignment table responsive to receiving at least one of the capacity status update messages.

47. The system as in claim 41, wherein the signaling controller is responsive to the setup request message for sending the capacity assign/release schedule message to at least one of the switches.

48. The system as in claim 41, wherein the signaling controller is responsive to an assignment confirmation/ denial message for sending the setup request message to at least one of the end-stations and gateways.

49. The system as in claim 48, wherein the signaling controller receives a denial in the assignment confirmation/ denial message from one of the switches when the assigned schedule is not available.

50. The system as in claim 48, wherein the signaling controller is responsive to the setup request message from one of the end-stations and the gateways for computing a route and a transmission schedule responsive to the data in the adjacency delay table and associated capacity assignment table;
wherein the signaling controller sends a first one of the capacity assign/release messages to a first one of the switches;
wherein the signaling controller is responsive to the assignment confirmation/denial message from said first one of the switches for sending a second one of the capacity assign/release schedule messages to a second one of the switches; and
wherein the signaling controller is responsive to receiving positive ones of the assignment confirmation/denial messages from all said switches on said computed route, for sending a positive setup accept/reject message to at least one of the end-stations and the gateways.

51. The system as in claim 37, wherein the capacity status update message is transmitted via at least one of a reliable transport to one of said signaling controllers, an unreliable group multicast to a plurality of the signaling controllers, and a reliable group multicast transport to a plurality of the signaling controllers.

52. A method for exchanging signaling messages on a data network for the purpose of controlling a transfer of data packets, amongst a plurality of end-stations, each having a data network interface; the method utilizing a plurality of signaling controllers, each having a data network interface; and utilizing a plurality of switches, coupled via a plurality of inter-switch communication links; wherein each switch is further comprised of a data network interface and a switch signaling controller; and, wherein each said switch is further comprised of a plurality of uniquely addressable input ports and output ports; the method comprising:
coupling the switches to one another via the plurality of inter-switch communication links for the transfer of data packets within a plurality of predefined time intervals;
communicating over the data network via the respective data network interfaces amongst the end-stations, the plurality of signaling controllers, and the plurality of switches all; and
transferring of the data packets among the plurality of switches via the plurality of inter-switch communication links during respective ones of the plurality of predefined time intervals, wherein each of the predefined time intervals is comprised of a plurality of predefined time frames.

53. The method as in claim 52, wherein each of the switches is coupled to receive a common time reference signal; the method further comprising:
forwarding each of the data packets between a predefined plurality of selected ones of the switches during a predefined sequence of time frames for transfer of the data packets, comprising in combination a virtual pipe;
utilizing said virtual pipe for coupling data packets from at least one source and sending data packets to at least one destination.

54. The method as in claim 53, further comprising:
transferring data packets via the plurality of switches between specific ones of the sources and the destinations at predefined time frames in the predefined time sequence.

55. The method as in claim 54, further comprising:
maintaining in memory the sequence as a list of switches and respective related lists of time frames.

56. The method as in claim 53, further comprising:
establishing the virtual pipe responsive to the signaling controller, wherein the signaling controller is responsive to a setup request message.

57. The method as in claim 53, further comprising:

forwarding the data packets between selected ones of the switches in predefined time intervals responsive to the common time reference signal.

58. The method as in claim 52, wherein the inter-switch communication links that are coupling the switches are part of the said data network.

59. The method as in claim 52, wherein the inter-switch communication links that are coupling the switches are distinct from the data network.

60. The method as in claim 52, further comprising:

distributing the signaling controller operation in at least one of the switches and one of the end-stations.

61. The method as in claim 52, wherein the data network is comprised of a plurality of nodes; the method further comprising:

distributing at least one of the signaling controllers in at least one node distinct from the end-stations and the switches.

62. The method as in claim 52, wherein there are a plurality of gateways, each having a plurality of data network interfaces and a plurality of uniquely addressable input ports and output ports.

63. The method as in claim 62, further comprising:

distributing the signaling controller in at least one of the gateways.

64. The method as in claim 63, further comprising:

coupling at least one pair of input and output ports of the gateway to at least one of the end-stations via one of the data network interfaces.

65. The method as in claim 52, wherein the data network is at least one of the following:

Internet protocol (IP) protocol, intranet network, extranet network, frame relay network, asynchronous transfer mode (ATM) network, an-optical network "wherein transmission of data packets is done over optical fiber and wherein switching of data packets is performed utilizing optical switches has been inserted after the term "network".

\* \* \* \* \*